(12) United States Patent
Marchese

(10) Patent No.: US 12,036,524 B2
(45) Date of Patent: Jul. 16, 2024

(54) MIXING BOWL AND LINER SYSTEM

(71) Applicant: Luisa Marchese, Tyler, TX (US)

(72) Inventor: Luisa Marchese, Tyler, TX (US)

(*) Notice: Subject to any disclaimer, the term of this patent is extended or adjusted under 35 U.S.C. 154(b) by 58 days.

(21) Appl. No.: 17/984,759

(22) Filed: Nov. 10, 2022

(65) Prior Publication Data

US 2024/0157315 A1 May 16, 2024

(51) Int. Cl.
*B01F 35/511* (2022.01)
*A47J 43/07* (2006.01)
*B01F 27/80* (2022.01)
*B01F 101/00* (2022.01)

(52) U.S. Cl.
CPC ......... *B01F 35/511* (2022.01); *A47J 43/0705* (2013.01); *A47J 43/0727* (2013.01); *B01F 27/80* (2022.01); *B01F 2101/1805* (2022.01)

(58) Field of Classification Search
CPC ........ B01F 35/00–511; B01F 27/00–80; B01F 2101/00–1805; A47J 43/0705; A47J 43/0727
See application file for complete search history.

(56) References Cited

U.S. PATENT DOCUMENTS

| | | | |
|---|---|---|---|
| 2,648,514 A | 8/1953 | Rosier | |
| 3,070,275 A | 12/1962 | Bostrom | |
| 4,015,945 A * | 4/1977 | Frankel | A61B 17/8833 366/139 |
| 6,401,955 B1 * | 6/2002 | Yang | B65D 81/3869 220/672 |
| D550,507 S | 9/2007 | Picozza | |
| 8,919,590 B2 | 12/2014 | Gillette | |
| 2003/0080128 A1 * | 5/2003 | Brodner | B65D 25/205 220/23.87 |
| 2009/0045194 A1 * | 2/2009 | Rhee | B65D 81/3869 220/23.89 |
| 2010/0018970 A1 * | 1/2010 | Jain | A01K 7/00 220/62.11 |
| 2012/0138608 A1 | 6/2012 | Rusnak | |
| 2015/0258514 A1 * | 9/2015 | Boozer | A47J 43/0727 366/142 |

FOREIGN PATENT DOCUMENTS

GB 2319951 10/1998

* cited by examiner

Primary Examiner — Kareen K Thomas

(57) ABSTRACT

A mixing bowl and liner system for lining a mixing bowl so that the mixing bowl can be used without soiling it includes a rigid mixing bowl defining a bowl cavity. The mixing bowl has an interior surface adjacent the bowl cavity and a top edge defining an opening to said bowl cavity. A liner is insertable into the bowl cavity and comprises a wall, a rim, and a spout. The wall is coextensive with the interior surface of the mixing bowl and the rim rests on the top edge of the mixing bowl when the liner is inserted into the mixing bowl. The spout is coupled to the rim and has a pair of ridges which protrude outwardly in converging alignment.

17 Claims, 5 Drawing Sheets

MIXING BOWL AND LINER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to bowl liners and more particularly pertains to a new bowl liner for lining a mixing bowl so that the mixing bowl can be used without soiling it.

(2) Description of Related Art Including Information Disclosed Under 37 CFR 1.97 and 1.98

The prior art relates to bowl liners for use with mixing bowls. The most pertinent prior art disclosure comes from U.S. Pat. No. 8,919,590 B2 (the '590 patent) which discloses an assembly of a mixing bowl, a liner and a lid, wherein the liner is configured to be closely received into the mixing bowl. However, the '590 patent and the rest of the prior art fail to disclose a mixing bowl and liner system wherein a spout protrudes from a rim of the liner for facilitating the pouring of liquid ingredients. The prior art also does not disclose a rim with a rib protruding around it for receiving a complementary groove in a lid therein to secure the lid to the liner.

BRIEF SUMMARY OF THE INVENTION

An embodiment of the disclosure meets the needs presented above by generally comprising a rigid mixing bowl defining a bowl cavity. The mixing bowl has an interior surface adjacent the bowl cavity and a top edge defining an opening to said bowl cavity. A liner is insertable into the bowl cavity and comprises a wall, a rim, and a spout. The wall is coextensive with the interior surface of the mixing bowl and the rim rests on the top edge of the mixing bowl when the liner is inserted into the mixing bowl. The spout is coupled to the rim and has a pair of ridges which protrude outwardly in converging alignment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
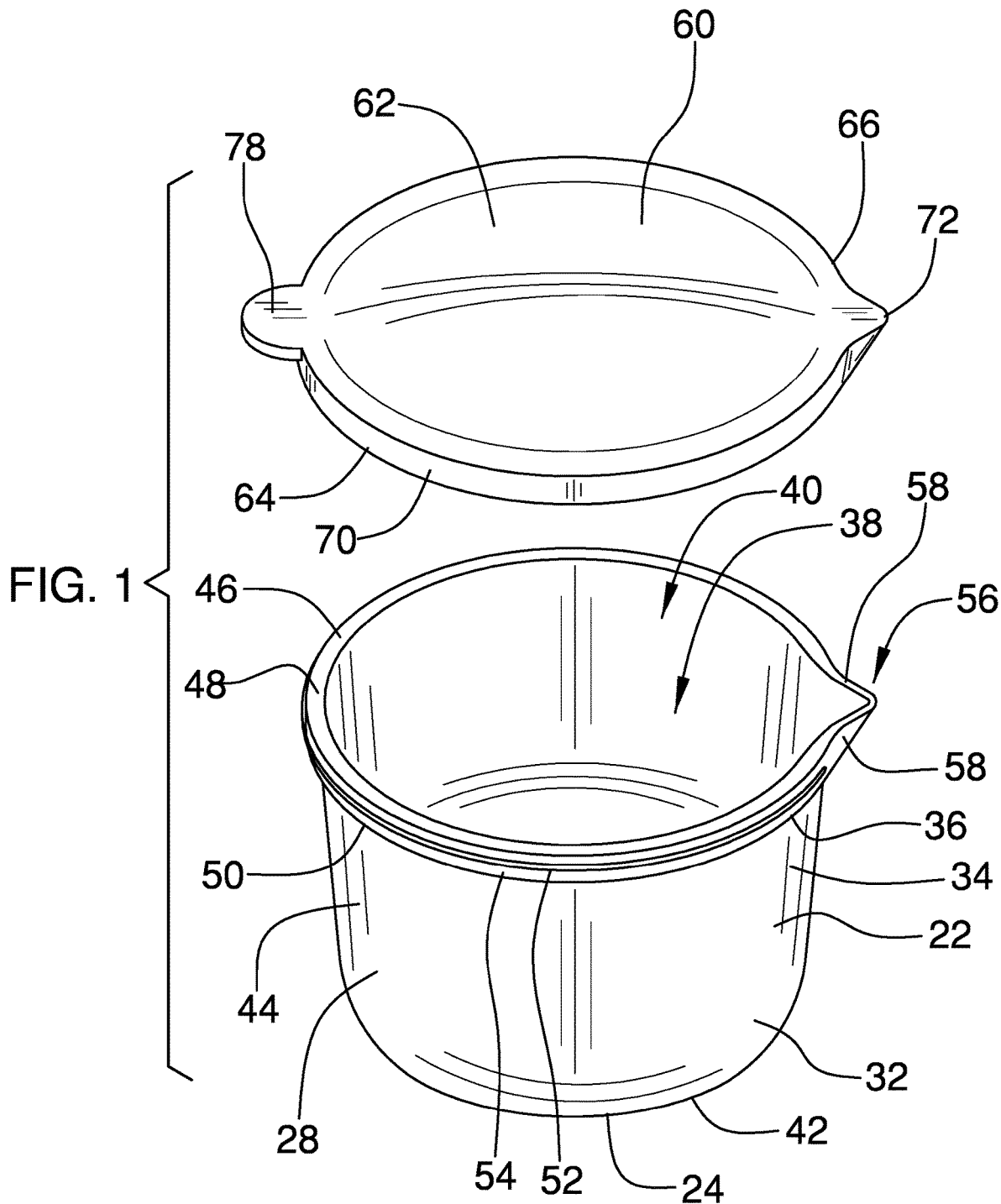
FIG. 1 is a front perspective view of a liner and a lid of a mixing bowl and liner system according to an embodiment of the disclosure.
Figure 2:
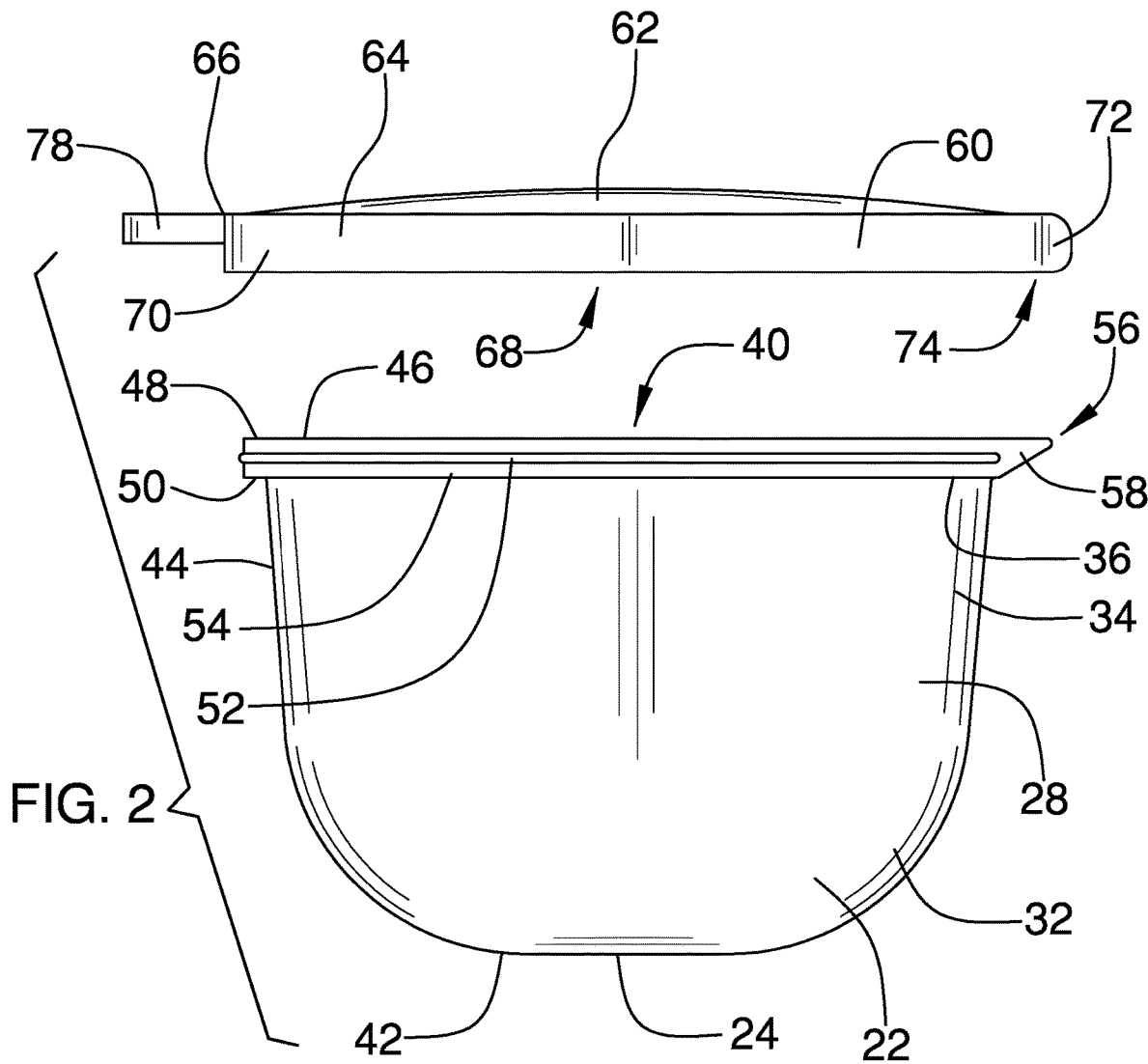
FIG. 2 is a front view of a liner and a lid of an embodiment of the disclosure.
Figure 3:
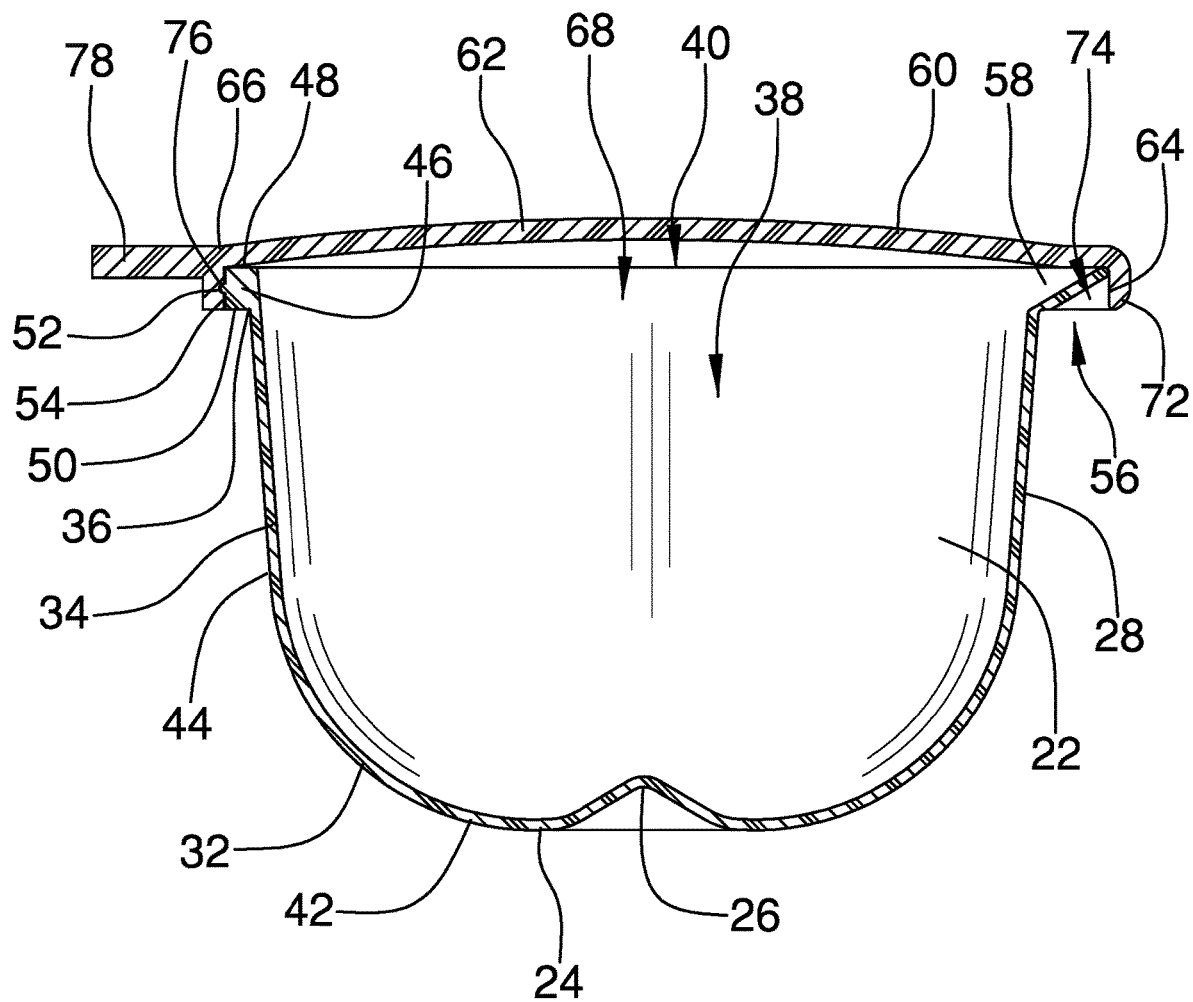
FIG. 3 is a front cross-sectional view of a liner and a lid of an embodiment of the disclosure.
Figure 4:
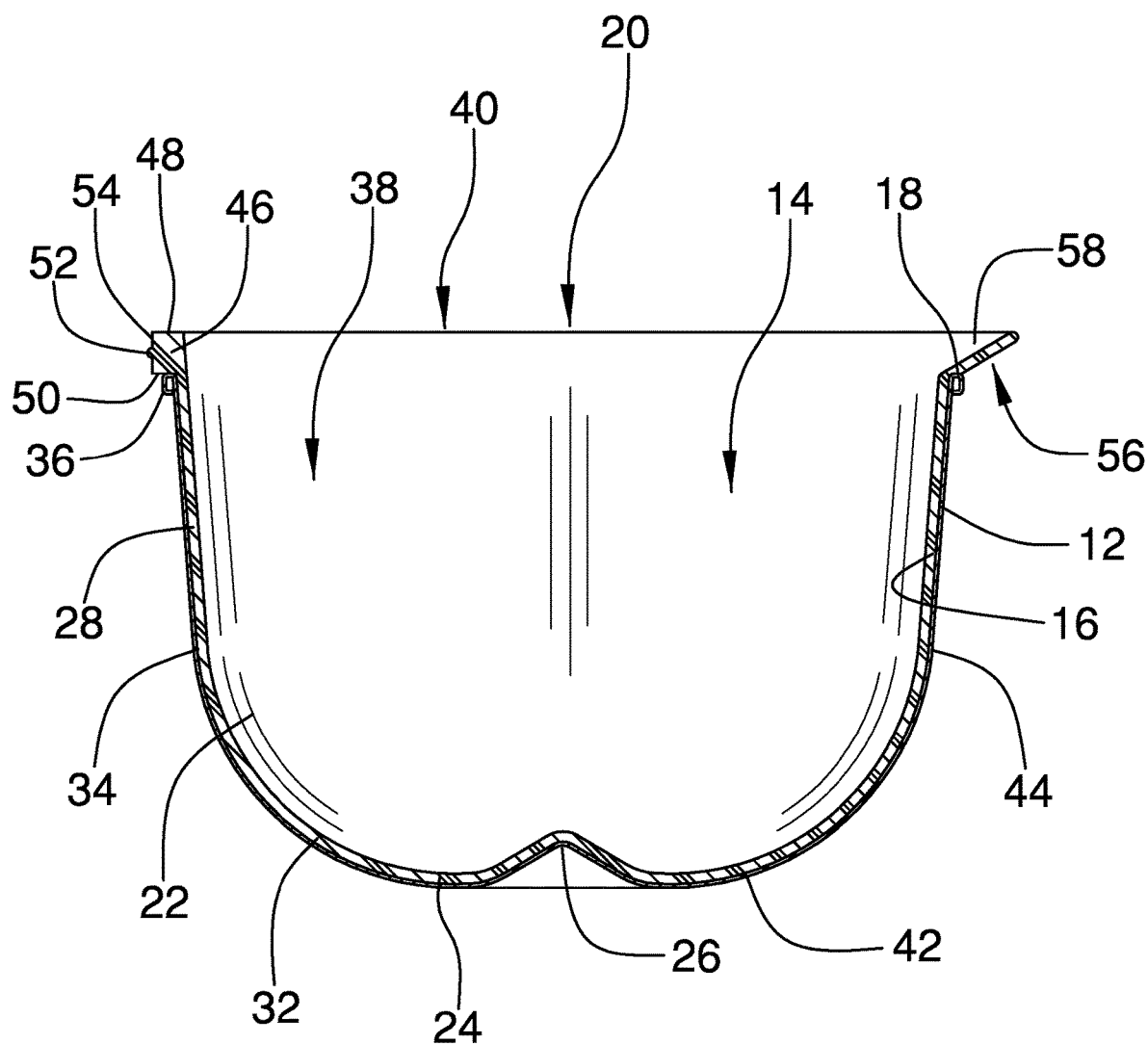
FIG. 4 is a front cross-sectional view of a liner and a mixing bowl of an embodiment of the disclosure.
Figure 5:
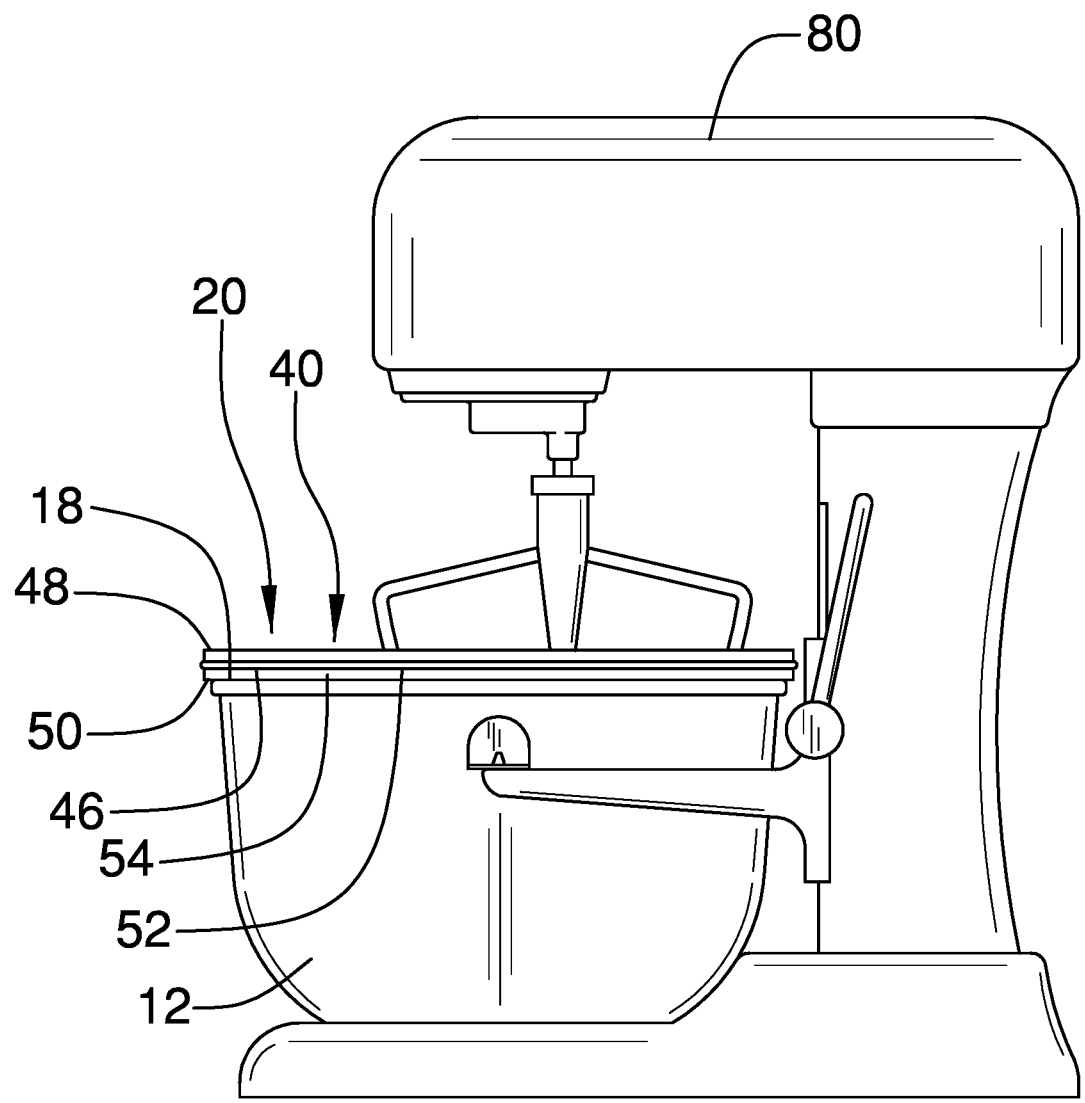
FIG. 5 is an in-use view of a liner and a mixing bowl of an embodiment of the disclosure.

With reference now to the drawings, and in particular to FIGS. 1 through 5 thereof, a new bowl liner embodying the principles and concepts of an embodiment of the disclosure and generally designated by the reference numeral 10 will be described.

As best illustrated in FIGS. 1 through 5, the mixing bowl and liner system 10 generally comprises a mixing bowl 12 constructed of a rigid material, which may be metal or a like material, and defining a bowl cavity 14. The mixing bowl 12 has an interior surface 16 adjacent the bowl cavity 14 and has a top edge 18 defining an opening to the bowl cavity 14. A liner 22 is insertable into the bowl cavity 14 and comprises a base wall 24, a perimeter wall 28, a rim 46, a rib 52, and a spout 56. The base wall 24 has a central portion 26 centered on the base wall 24 which protrudes conically upward. The perimeter wall 28 is coupled to the base wall 24 and has a curved portion 30 and an upright portion 32. The curved portion 30 is coupled to an outer edge 34 of the base wall 24 and extends outwardly from the base wall 24, curving upwardly. The upright portion 32 extends upwardly from the curved portion 30, widening from the curved portion 30 to a top edge 36 of the perimeter wall 28. The base wall 24 and the perimeter wall 28 collectively define a liner cavity 38, and the top edge 36 of the perimeter wall 28 defines an opening 40 to the liner cavity 38. An outer surface 42 of the base wall 24 and an outer surface 44 of the perimeter wall 28 are collectively coextensive with the interior surface 16 of the mixing bowl 12 when the liner 22 is inserted into the bowl cavity 14.

The rim 46 is coupled to the top edge 36 of the perimeter wall 28 and protrudes outwardly. The rim 46 has a top side 48 and a bottom side 50, wherein the bottom side 50 of the rim 46 resting on the top edge 18 of the mixing bowl 12 when the liner 22 is inserted into the bowl cavity 14. The rib 52 is coupled to and protrudes from an outer surface 54 of the rim 46. The rib 52 is centered between the top side 48 and the bottom side 50 of the rim 46. The spout 56 is coupled to the rim 46, having a pair of ridges 58 coupled to the rim 46 which extend outwardly in converging alignment.

A lid 60 is constructed of a resiliently flexible material and is positionable to cover the liner cavity 38 such that the opening 40 to the liner cavity 38 is closed. The lid 60 comprises a top wall 62 and an annular wall 64 extending from a perimeter edge 66 of the top wall 62. The annular wall 64 defines an aperture 68 and has a rim portion 70 and a spout portion 72, wherein the rim portion 70 has an interior surface complementary in shape to the rim 46 and the spout portion 72 protrudes outwardly from the rim portion 70 to define a notch 74. The notch 74 is a portion of the aperture 68 and is complementary in shape to the spout 56 such that the annular wall 64 is able to collectively receive the rim 46 and the spout 56 through the aperture 68 when the lid 60 covers the liner cavity 38. The top wall 62 bulges away from the mixing bowl 12 when the lid 60 covers the liner cavity 38. A groove 76 is positioned in the interior surface of the rim portion 70 of the annular wall 64 which is complementary in shape to the rib 52 so that the groove 76 receives the rib 52 therethrough when the annular wall 64 collectively receives the rim 46 and the spout 56 therethrough. The rib 52 engages the annular wall 64 when the lid 60 covers the liner cavity 38 such that the lid 60 is removably secured to the liner 22. A semicircular lift tab 78 protrudes outwardly from the perimeter edge 66 of the top wall 62 which is positioned opposite the spout portion 72 of the annular wall 64 which facilitates gripping of the lid 60 for removal from the liner 22. The lid 60 may be constructed of a plastic such as polyethylene or a like material. The liner 22 may also be constructed of a plastic such as polyethylene or a like material and may be the same material as the lid 60.

In use, the liner 22 is inserted into the bowl cavity 14 defined by the mixing bowl 12. Ingredients for mixing are placed into the liner 22 and mixed, possibly by a stand mixer 80. Then the liner 22 is removed from the mixing bowl 12, freeing up the mixing bowl 12 to be used again for mixing without requiring an intermediate cleaning step. Multiple liners 22 may also be used with the mixing bowl 12 consecutively so that several mixes can take place without cleaning the mixing bowl 12. The spout 56 facilitates pouring liquid ingredients. And the lid 60 covers the liner 22 so that the liner 22 may store mixed ingredients while sealing out air and preventing other items from falling into the liner 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mixing bowl and liner system comprising:
    a mixing bowl being constructed of a rigid material and defining a bowl cavity, said mixing bowl having an interior surface adjacent said bowl cavity and a top edge defining an opening to said bowl cavity; and
    a liner being insertable into said bowl cavity and comprising:
        a wall being dome-shaped and defining a liner cavity, said wall having a top edge defining an opening to said liner cavity, an outer surface of said wall being coextensive with said interior surface of said mixing bowl when said liner is inserted into said mixing bowl;
        a rim being coupled to said top edge of said wall and protruding outwardly, said rim having a top side and a bottom side, said bottom side of said rim resting on said top edge of said mixing bowl when said liner is inserted into said mixing bowl; and
        a spout being coupled to said rim, said spout having a pair of ridges coupled to said rim and extending outwardly in converging alignment; and
    a lid, said lid being constructed of a resiliently flexible material, said lid being positionable to cover said liner cavity such that said opening to said liner cavity is closed, said lid comprising:
        a top wall; and
        an annular wall extending from a perimeter edge of said top wall, said annular wall defining an aperture and having a rim portion and a spout portion, said rim portion having an interior surface complementary in shape to said rim of said liner, said spout portion protruding outwardly from said rim portion and defining a notch, said notch being a portion of said aperture and being complementary in shape to said spout of said liner such that said annular wall is able to collectively receive said rim of said liner and said spout of said liner through said aperture when said lid covers said liner cavity, said annular wall engaging said rim of said liner when said lid covers said liner such that said lid is removably secured directly to said liner.

2. The system of claim 1, further comprising said wall of said liner comprising a base wall and a perimeter wall, said perimeter wall extending upwardly from an outer edge of said base wall.

3. The system of claim 2, further comprising a central portion of said base wall being centered on said base wall and protruding conically upward.

4. The system of claim 2, further comprising said perimeter wall having a curved portion and an upright portion, said curved portion being coupled to said outer edge of said base wall, said curved portion extending outwardly from said base wall and curving upwardly, said upright portion extending upwardly from said curved portion.

5. The system of claim 4, further comprising said upright portion widening from said curved portion to a top edge of said wall.

6. The system of claim 1, further comprising said top wall bulging away from said stand mixing bowl when said lid covers said liner.

7. The system of claim 1, further comprising a lift tab protruding outwardly from said perimeter edge of said top wall, said lift tab being positioned opposite said spout portion of said annular wall.

8. The system of claim 7, further comprising said lift tab being semicircular.

9. The system of claim 1, further comprising:
a rib being coupled to and protruding from an outer surface of said rim; and
a groove being positioned in said interior surface of said rim portion of said annular wall, said groove being complementary in shape to said rib, said groove receiving said rib therethrough when said annular wall collectively receives said rim and said spout therethrough, said rib engaging said annular wall when said lid covers said liner cavity such that said lid is removably secured to said liner.

10. The system of claim 9, further comprising said rib being centered between said top side and said bottom side of said rim.

11. The system of claim 1, further comprising said lid being constructed of plastic.

12. The system of claim 11, further comprising said lid being constructed of polyethylene.

13. The system of claim 1, further comprising said liner and said lid having an equivalent composition.

14. The system of claim 1, further comprising said liner being constructed of plastic.

15. The system of claim 14, further comprising said liner being constructed of polyethylene.

16. The system of claim 1, further comprising said mixing bowl being constructed of metal.

17. A mixing bowl and liner system comprising:
a mixing bowl being constructed of a rigid material and defining a bowl cavity,
said mixing bowl having an interior surface adjacent said bowl cavity and
a top edge defining an opening to said bowl cavity;
a liner being insertable into said bowl cavity and comprising:
a base wall having a central portion, said central portion being centered on said base wall, said central portion protruding conically upward;
a perimeter wall having a curved portion and an upright portion, said curved portion being coupled to an outer edge of said base wall, said curved portion extending outwardly from said base wall and curving upwardly, said upright portion extending upwardly from said curved portion, said upright portion widening from said curved portion to a top edge of said perimeter wall, said base wall and said perimeter wall collectively defining a liner cavity, said top edge of said perimeter wall defining an opening to said liner cavity, an outer surface of said base wall and an outer surface of said perimeter wall being collectively coextensive with said interior surface of said mixing bowl when said liner is inserted into said bowl cavity;
a rim being coupled to said top edge of said perimeter wall and protruding outwardly, said rim having a top side and a bottom side, said bottom side of said rim resting on said top edge of said mixing bowl when said liner is inserted into said bowl cavity;
a rib being coupled to and protruding from an outer surface of said rim, said rib being centered between said top side and said bottom side of said rim; and
a spout being coupled to said rim, said spout having a pair of ridges coupled to said rim and extending outwardly in converging alignment; and
a lid, said lid being constructed of a resiliently flexible material, said lid being positionable to cover said liner cavity such that said opening to said liner cavity is closed, said lid comprising:
a top wall;
an annular wall extending from a perimeter edge of said top wall, said annular wall defining an aperture and having a rim portion and a spout portion, said rim portion having an interior surface complementary in shape to said rim of said liner, said spout portion protruding outwardly from said rim portion and defining a notch, said notch being a portion of said aperture and being complementary in shape to said spout of said liner such that said annular wall is able to collectively receive said rim of said liner and said spout of said liner through said aperture when said lid covers said liner cavity, said top wall bulging away from said mixing bowl when said lid covers said liner cavity;
a groove being positioned in said interior surface of said rim portion of said annular wall, said groove being complementary in shape to said rib, said groove receiving said rib therethrough when said annular wall collectively receives said rim and said spout therethrough, said rib engaging said annular wall when said lid covers said liner cavity such that said lid is removably secured directly to said liner; and
a lift tab protruding outwardly from said perimeter edge of said top wall, said lift tab being positioned opposite said spout portion of said annular wall, said lift tab being semicircular.

* * * * *